March 6, 1956 F. BEERBAUM ET AL 2,737,629
EQUALIZER ARRANGEMENT WITH AN ATTENUATION CHARACTERISTIC PROPORTIONAL TO FREQUENCY
Filed April 5, 1950 4 Sheets-Sheet 1
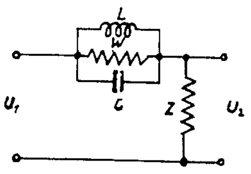
Fig. 1a
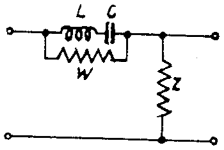
Fig. 1b
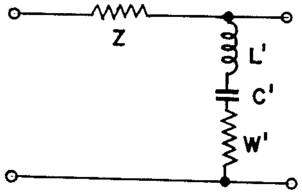
Fig. Ic
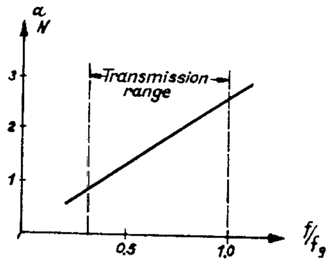
Fig. 2
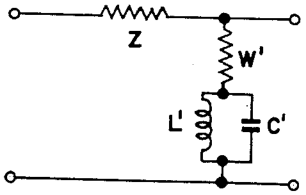
Fig. Id
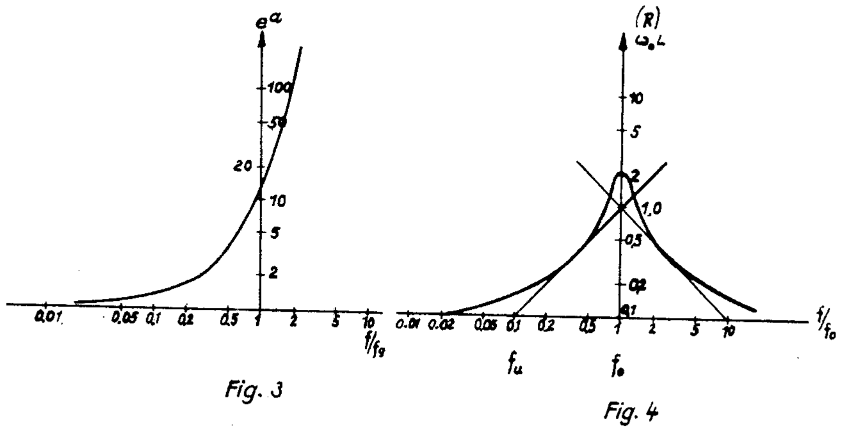
Fig. 3 Fig. 4
Dr. Karl Steinbuch
Theodor Grewe
Friedrich Beerbaum Dr. Karl Steinbuch
Theodor Greve
Friedrich Beerbaum Dr. Karl Steinbuch
Theodor Greene
Friedrich Beerbaum United States Patent Office 2,737,629

Patented Mar. 6, 1956

2,737,629

EQUALIZER ARRANGEMENT WITH AN ATTENUATION CHARACTERISTIC PROPORTIONAL TO FREQUENCY

Friedrich Beerbaum and Theodor Grewe, Korntal, Stuttgart, and Karl Steinbuch, Waiblingen, Germany, assignors to International Standard Electric Corporation, New York, N. Y., a corporation of Delaware Application April 5, 1950, Serial No. 154,106

Claims priority, application Germany April 12, 1949

9 Claims. (Cl. 333—28)

In electrical transmission engineering, there are frequently needed circuits the attenuation of which increases or decreases in a manner proportional to frequency through a certain frequency range. Such frequency-dependent networks are primarily needed for equalizing line repeaters spaced out along carrier transmission lines the attenuation of which, as is known, increases with frequency. It is known practice to arrange these equalizing means either detached from the repeaters proper or integrated in their circuits preferably in the degeneration path, where in the latter case the characteristic of the repeater is so affected that the changes in line attenuation are canceled out. Proportioning such attenuator networks is relatively cumbersome, and mostly results in an arrangement involving a considerable amount of circuit components. This applies in particular to the so-called pre-equalizers outside the repeater circuit.

This invention relates to equalizer circuits which are preferably inserted in the degeneration path of repeaters. They are, however, not restricted to this application. For automatically controlling wide-band repeaters, there is already known the use of several temperature-dependent resistors arranged in various repeater stages and controlled individually by its pilot frequency sent over the line. Although these regulating means proper involve exceedingly small additional expenses, still there is required—apart from the necessary use of several pilot frequencies—considerable circuitry for effecting the control, so that the overall expenses are rather high. But even most of the known equalizing four-terminal networks which find use inside the repeater circuit proper exhibit elaborate circuitry, in particular when exacting demands as to linearity are placed on the fan-shaped families of characteristics needed for adjusting such networks. Thus even with the hereto known bridged-T sections with high-impedance output, the requirements are not met adequately, and in particular where the frequency characteristics have small slopes. In addition, the high-impedance in the output is detrimental.

This invention based on the problem to create a relatively simple equalizer circuit having adequate linearity throughout the operational range. The most simple type equalizer circuits consisting of a tuned circuit and a resistor, as shown in Figs. 1*a* and 1*b*, usually fail to meet adequately the basic requirement of attenuation proportional to frequency.

It has been recognized, however, that if certain conditions are fulfilled, linearity within 1% of maximum attenuation can be obtained throughout a sufficient range of frequencies. Accordingly, the invention consists in the use of a four-terminal network, including a simple tuned or resonant, circuit with a storage factor of $Q \approx 2.4$ and a maximum attenuation $a_{max} \approx 2.6$ nepers in the longitudinal arm and a resistance Z in the transversal arm. Also, in accordance with the invention reciprocal network may be employed as a basic circuit from which the fan pattern of the attenuation characteristics is obtained by transformer-type changes in the reflected impedance of the tuned circuit while its free end is simultaneously loaded by a properly dimensioned series-network including a resistor (R) and an inductor ($L_1$).

The objects of this invention and the manner of attaining them will become more apparent and the invention itself will be best understood, by reference to the following description of an embodiment of the invention taken in conjunction with the accompanying drawings, wherein:

Figs. 1*a* and 1*b* illustrate well known equalizer circuits;

Figs. 1*c* and 1*d* "reciprocal networks" of 1*a* and 1*b*, respectively;

Fig. 2 is a graph showing cable attenuation characteristics;

Figs. 3 and 4 are logarithmic plots of given frequency versus impedance characteristics;

This invention based on the following principle: In a four-terminal network, consisting of a parallel-resonant circuit in the longitudinal arm, loaded by a resistor Z as shown in Fig. 1, the ratio $U_1/U_2$ of input and output voltages is proportional to the admittance of the input end. In the lower frequency region, the impedance of the tuned circuit is $Z+i\omega L$ to a first approximation, while at higher frequencies the shape of the characteristic is determined by the resonance step-up, and beyond this it is the capacitance that affects the characteristic. If this function is plotted logarithmically vs. the respective frequencies, as shown in Fig. 4, and if the same is done with the cable attenuation characteristic according to Fig. 2, which is plotted logarithmically as shown in Fig. 3, comparison of the plots of required attenuation (Fig. 3) and the admittance characteristic (Fig. 4) reveals that by choice of a certain storage factor and an appropriate frequency ratio $f_u/f_0$, where $f_0$ is the resonant frequency and $f_u$ is given by the relation $2\pi f_u.L=Z$, good agreement of both curves can be accomplished so it is possible to obtain linearity within 1% of maximum attenuation throughout a frequency spectrum including about three octaves. Approximative analysis confined by experimentation has disclosed that the storage factor to this end should be $Q=2.42$ and the ratio $f_u/f_0=0.19$.

In the circuit of Fig. 1*a*, the attenuation *a* is computed by the following equation $$a=\tfrac{1}{2}.\log_e \frac{(1+W/Z)^2+Q^2\Omega^2}{1+Q^2\Omega^2}$$

with $$Q=W\sqrt{C/L}=\text{storage factor}$$

$$\Omega=f_u/f_0-f_0/f_u$$

$$f_0=\tfrac{1}{2}\pi\sqrt{L/C}$$

$a$=attenuation in nepers where C represents the capacity in farads and L represents the inductance in henries. The maximum attenuation at resonance, hence for $f_u=f_0$ is then found to be $$a_{max}=\log_e(1+W/Z)\approx 2.6 \text{ nepers}$$

which in turn gives the values $W=12.7Z$, $L=0.84Z/f_0$, and $$C=0.03\frac{1}{f_0.Z}$$

In a logically equivalent manner, the corresponding values can be computed for a circuit as shown in Fig. 1*b*. The reciprocal networks, of course, exhibit the same behaviour. Sections having so large a maximum attenuation, however, have generally a small field of application in carrier frequency engineering. It is thus necessary, to achieve a fan pattern of attenuation characteristics, with no or little departure from the required linearity in the characteristics of the slope.

Figure 5:
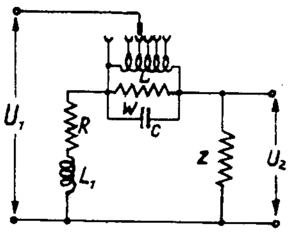
Fig. 5 shows one circuit embodiment of the invention.
Figure 7:
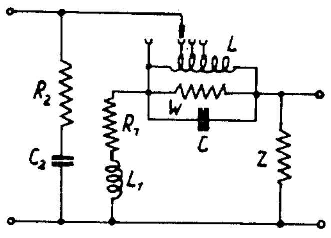
Fig. 7 shows another embodiment of the invention.
Figure 6:
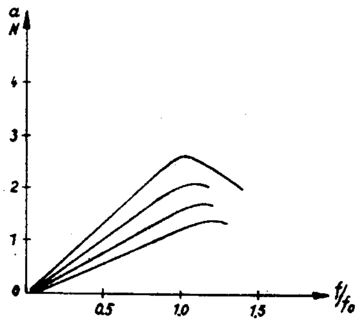
Fig. 6 shows the family of curves obtained from the circuit of Fig. 5.

The following is the detailed description of two different possibilities of deriving from the basic circuit under this invention a fan-pattern of attenuation characteristics with linearity maintained over the required frequency ranges. The transformer-type variation of the reflected tuned-circuit impedance by stepwise tapping down the input on the circuit coil, is not successful in the equalizer circuit if proportioned under the foregoing rules. If, however, at the same time the free end of the tuned circuit is loaded down by a series-connection including a resistance and a coil, as shown in Fig. 5, a fan-pattern can be realized upon proper dimensioning of the elements with about the same accuracy in frequency linearity, as is available in the basic system without fanning. This fanning-out feature is not restricted to basic elements of the herein specified dimensioning but may be used to advantage even in sections designed for some different maximum attenuation. The so obtained family of curves is shown in Fig. 6.

Where in equalizer circuits of this kind an input impedance independent of frequency is demanded, this requirement can be met by combining two reciprocal networks to make a bridged-T section having a resistance Z equal to the iterative impedance. An approximate fulfilment of these conditions can, however, as well be obtained by connecting suitably chosen R—C combinations in parallel to the input end. These combinations, however should be dimensioned different for each of the fan settings. In order, however, to eliminate the required re-connections and higher expenses, this R—C combination may be set at a medium setting of the fan-system, comprising with certain discrepancies at the remaining settings (Fig. 7).

Another solution of the problem of fanning-out which avoids additional expenses and permits continuous control of the slope of the attenuation characteristics, forms another aspect of this invention. Accordingly the resonant frequency of the tuned circuit is controlled, with the ratio $C/L$ of the circuit elements maintained constant at a given time. Thus the required lower slopes of attenuation characteristics are obtained without impairing the linearity feature of the attenuation characteristic. In order to derive this fan-pattern of characteristics from the attenuation characteristics of the basic circuit with its maximum attenuation of 2.6 nepers, a proportional decrease is thus given to both the capacitance C and the inductance L. In actual practice, this problem can be solved by a suitable mechanical linkage between a variable condenser and a permeability-tuned coil.

With the use of basic circuits as shown in Fig. 1, and with the specified conditions observed—storage factor $Q=2.42$ (Fig. 1*a*) and 5.4 (Fig. 1*b*), respectively, and a maximum attenuation $a_{max}=2.6$ nepers—the condition of linearity is achieved over a range from 0.1 $f_0$ up to 0.9 $f_0$ within some 1% of the maximum attenuation. $f_0$ herein denotes the resonance frequency of the circuit. The reciprocal networks of these circuits behave similarly.

Figure 8:
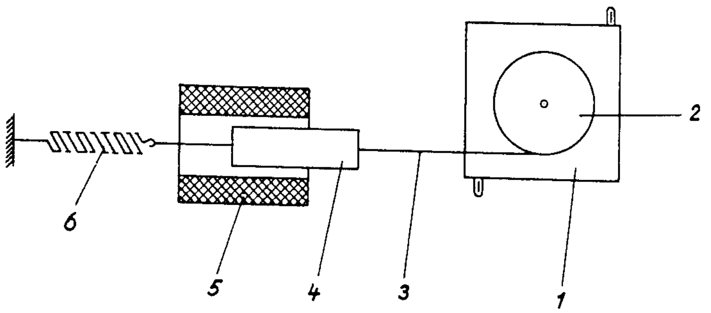
Figs. 8, 9 and 10 show a mechanical arrangement for operating the circuit of the invention.

Fig. 8 shows schematically a practical application of the arrangement under this invention where 1 refers to a commercially available variable condenser. On its shaft mounted a pulley 2 over which is stretched a cord 3 the other extremity of which is attached to the moving iron core 4 of a coil 5. A spring 6 attached to the remote end of the core and exerts a restoring force. By appropriate choice of core and condenser-plate shapes, the capacitance and permeability increments may be correlated in a manner that both quantities change in a proportional way.

Figure 9:
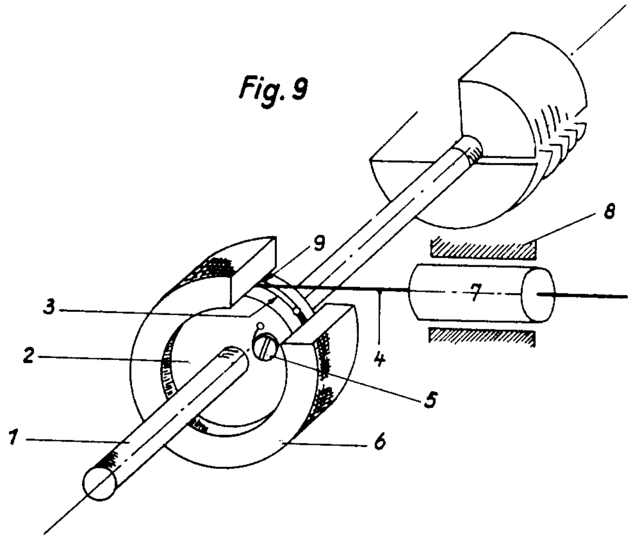
Figure 10:
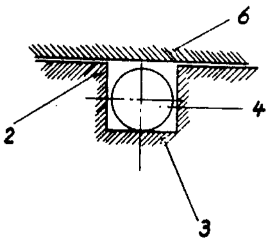

Particular convenience of structural design is offered by the gearing system shown in the Figs. 9 and 10. On shaft 1 of the variable condenser mounted a disc 2 the rim of which is provided with a groove 3 extending completely around its circumference. In this groove there is positioned a spring-steel wire 4 one end of which is attached to the disc proper, for instance in the way readily obvious from the figure by a holding screw 5 under which the wire end, fed through an oblique bore from the groove to one of the lateral faces of the disc, is positioned to be thus clamped. In one of the terminal positions of the assembly, the spring-steel wire occupies almost all of the circumference of the groove around the disc while its other free end holds the iron-dust core 7 of a permeability-tuned coil 8 to which it has been fixed permanently in any of the known manners. To prevent the wire from slipping from its guiding groove under clockwise rotation of the shaft, hence with the core pushed, a shell 6 of any suitable material has been placed around the disc. In Fig. 10, the scale of the drawing has been enlarged to show the mounting more clearly. There is shown cross-section of groove, wire, and surrounding shell. The pushing and pulling forces act exactly tangential to the disc. Considering the relatively small displacements occurring in setting the device, it is secure notwithstanding its small gauge and high flexibility, and the spring-steel wire shows a sufficient degree of stiffness in pushing and it neither bends in nor out over its free length. The wire in these cases is somewhere around 29 gauge (0.3 millimeter dia.). The ratio of angular rotation and rectilinear displacement governs the choice of the disc diameter.

With an arrangement of this type it is possible to meet within sufficient accuracy the aforenamed basic conditions for maintaining attenuation characteristic linearity with changes of the resonant frequency through a factor or two.

Figure 11:
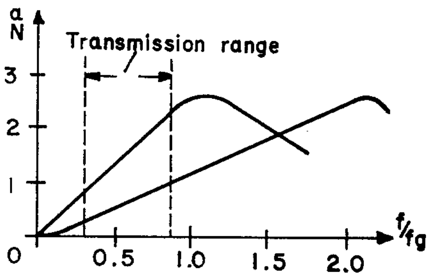
Fig. 11 shows an attenuation curve obtained from the use of the mechanical arrangement shown in Figs. 8, 9 and 10.

The particular advantage of this arrangement is in the fact that the attenuation characteristics of a more flat type can be attained by simply actuating only one control knob in a continuous manner and maintaing linearity (see Fig. 11). When using the arrangement under this invention for equalizing long-distance circuits, it is thus possible to integrate with the controlling knob a dial calibrated in route miles of the circuit. Another merit of this arrangement will be seen in the fact than when used as an equalizer in the degeneration path of a line repeater the continuous nature of control of the maximum attenuation over the specified controlling range (for instance between 1.2 and 2.4 nepers), i. e. the absence from any step-type switchovers, requires no switching operations in leveling up the overall system which possibly could introduce a howling condition to the repeater.

Figure 12:
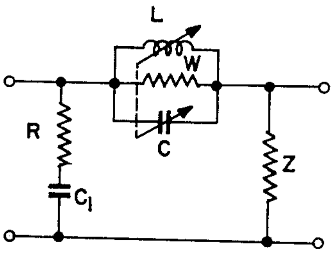
Fig. 12 shows another embodiment of the invention.

Here, as in the manner of the first example, two reciprocal network sections may be joined into a bridged T-section. In case frequency-independence of the input impedance is required or as shown in Fig. 12, an RC-network might be connected across the input end which has been adjusted to meet a medium attenuation characteristic. Without further detailed explanation it will be evident that with a fan-pattern of attenuation characteristics obtained in the described way the required degree of linearity is attained only if the frequency range over which equalization has to take place is not to exceed a one to nine ratio. In many actual cases this is entirely adequate. In a number of other cases, however, the frequency ranges over which equalization should take place will exceed the aforenamed value so the desired fan-pattern should be obtained in a different manner.

The following gives a solution to this problem which avoids additional expense with reference to the basic circuit but which provides a continuous fan-pattern for equalized frequency ranges wider than a 1 to 9 frequency ratio. While somewhat larger in this case, the errors still remain within practically tolerable limits. Under another aspect of this invention this is achieved by simultaneously varying both the resonance frequency and the maximum attenuation $a_0$ under the law $$a_0=5.02-2.4f_0/f_\infty$$

In this equation, $a_0$ refers to the maximum attenuation of the fan-pattern characteristics involved, while $f_0/f_\infty$ refers to the resonance frequency generalized with reference to that of the basic circuit. Such simultaneous control of resonance frequency and maximum attenuation can be achieved in the specified manner in a number of ways depending on which fundamental circuit has been chosen as a basic circuit. The fan-pattern is thus effected by controlling the resistance W and inductance L with a basic circuit used such as shown in Fig. 1*a* while with circuits of the type shown in Fig. 1*c*, the fan-pattern can be realized by simultaneously varying W′ and C′.

In the following the solution mentioned above will be described in detail on the basis of the accompanying figures. In addition to the already mentioned basic circuits shown in the Figs. 1*a* and 1*b*, the Figs. 1*c* and 1*d* present a pair of reciprocal basic circuits to the circuits shown in the Figs. 1*a* and 1*b*.

In the subsequent discussion of the principles on which the further invention is based, only Fig. 1*c* of the basic circuits will be detailed. Analogous reasoning will apply to the other connections shown in Fig. 1. By inspection of the circuit of Fig. 1*c* it will be obvious that at very low frequencies, W′ and L′ in the shunt arm can be neglected with respect to C′ so the attenuation characteristic is governed by C′Z. In contrast, near the resonance frequency the attenuation is determined by $W'/Z$ alone. If, however, the attenuation curves under the fan-like spreading are supposed to turn out rather linear, the two circuit elements C′ and W′ will have to vary in such a way is to certain laws as to their interrelation. In the already proposed basic circuit of Fig. 1*c*, optimum linearity is achieved if the following basic conditions are met:

$$W'_0=Z/12.7 \quad (1)$$

$$L'_0=0.03.Z/f_0 \quad (2)$$

$$C'_0=0.84.1/f_0Z \quad (3)$$

Any deviations from these linearity prerequisites will of course reflect in deviations from true linearity. The further development of this invention now specifies such conditions as involve a minimum of deviation from linearity in the case of the desired fan-type pattern. To find these conditions, the attenuation function of circuit Fig. 1*c* will have to be established first. It reads $$a+\tfrac{1}{2}\log_e\frac{(1+Z/W')^2+\Omega^2/\rho'^2}{1+\Omega^2/\rho'^2}$$

In this equation $\Omega$ and $\rho'$ stand for the following identities:

$$\Omega=\omega/\omega_0=\omega_0/\omega$$

$$\rho'=W'\sqrt{C'/L'}$$

Figure 13:
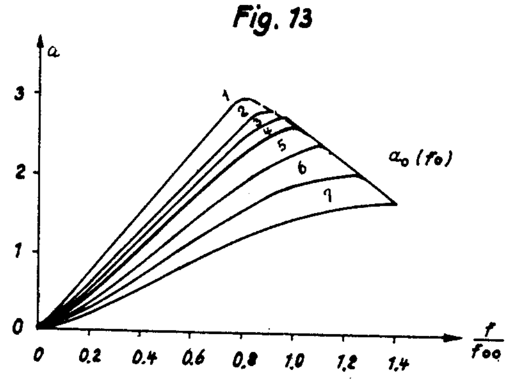
Figs. 13, 14 and 15 are curves illustrating various characteristics of the invention.

Although this attenuation function is of a relatively simple nature, the second derivative of it, $d^2a/d\omega^2$ which governs the curvature of the attenuation curve is of the sixth order in $\omega$, so for all practical purposes this function is useless for any further analysis. However, the most favorable relation between W′ and C′ with reference to linearity conditions from approximation formulas and vast empirical investigation have been found. In Fig. 13, a family of curves has been plotted which have originated in this way. All of these curves are based on fixed values of inductances L′ and Z. The controlled quantities were C′ and W′; this was done in such a way that linearity was upheld over the fan-pattern to the utmost degree possible.

If those points of the individual curves as represent maximum attenuation are interconnected, this yields some characteristic $a_0(f_0)$ which obeys the following approximative equation $$a_0=5.02-2.4f_0/f_\infty$$

In this equation, $f_0$ refers to the resonance frequency of the respective individual curve of the fan-pattern, while $f_\infty$ is the resonance frequency of the attenuation curve of the basic circuit.

Figure 14:
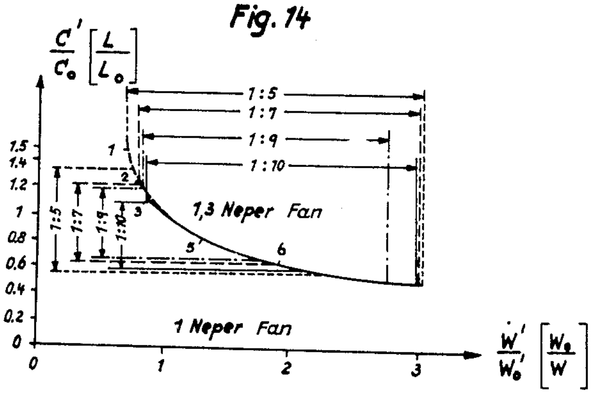

A relation between W′ and C′ corresponds to this interrelation between the maximum attenuation and the resonance frequency as shown in the curve of Fig. 14. Here, the values W′ and C′ refer to the values of $W'_0$ and $C'_0$ computed from the Equations 1 and 3. For the analogous nature of the circuits, Figs. 1*a* and 1*c*, these expressions also apply to circuit Fig. 1*a*. In it, the terms $W_0/W$ and $L/L_0$ will be substituted for the terms $W'/W$ and $C'/C$, respectively. The circuits shown in the Figs. 1*b* and 1*d* will undergo analogous treatment.

Figure 15:
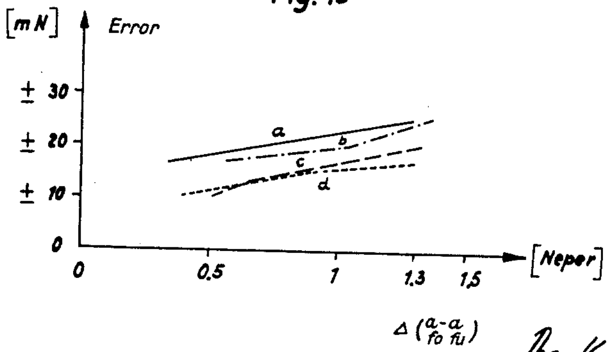

In the diagram shown in Fig. 14, the points (1) through (7) stand for the resonance frequencies of the curves shown in Fig. 13 and correspondingly labeled. Fig. 14 also gives the ranges within which the linearity conditions are met best for frequency bands ranging between 1:5 and 1:9; this is specified for fan-spreads of 1 neper and 1.3 nepers alternatively. These ranges resulted from an evaluation of the curves of Fig. 13 and the error curves shown in Fig. 15 which are plotted versus the actual spread of the attenuation fan-pattern in nepers and which thus show the interrelation between that spread of the fan-pattern and what linearity errors result therefrom. In this case, "actual spread" is that spread of the fan which remains after the basic attenuation at the lower end of the transmission range has been subtracted. Along the ordinate, the errors are plotted in millineper units which show by what degrees the respective attenuation curve deviates from linearity. Curve (*a*) shows the errors for a 1:10 frequency range (corresponding to a range between .09 and .9$f_0$) while curve (*b*) applies to a 1 to 9 frequency range (.095 to .855), curve (*c*) to a 1 to 7 range (.12 to .84), and curve (*d*) to a 1 to 5 range (.14 to .7). It is obvious that in the case of a 1 to 10 frequency range, a fan-pattern spread of about 1.3 nepers is possible with a maximum error within ±.025 neper.

As mentioned in the introduction, practical realization of a stepless attenuation equalizer for frequency ranges exceeding a 1 to 9 ratio can be accomplished in different ways as dependent on the specified conditions. A solution based upon the fundamental circuit shown in Fig. 1*a* consists in using a variable inductance and a variable condenser; it offers the advantage that almost no limitations are imposed with reference to the choice of the iterative impedance (Z). A rather high-valued adjustable resistor is required, however. If the basic circuit Fig. 1*c* is used where the fan-pattern can be effected by a variable resistor and a variable (plate-type) condenser, rather simple solutions will result with reference to the physical construction; the iterative impedance, however, is limited in this case to generally high values. If a variable condenser offering a capacitance range of 540 micromicrofarads is used, Z equals 7,000 ohms with an overall range extending between 12 and 120 kc. A solution which approximately realizes the required interrelation of W′ and C′ is given by the use of a linear potentiometer and a variable plate condenser with a logarithmical plate-pattern. In spite of these limitations, however, the advantages obtained from attenuation equalizers of this description are dominant: they consist chiefly in the simplicity of their design and in their extremely low expense. The linearity, achieved under this invention over a relatively wide frequency range by means of such simplicity, meets most all practical needs.

We claim:

1. An adjustable attenuation equalizer for transmission lines, comprising a four terminal network having series and shunt arms; a resonant circuit having a Q factor of approximately 2.4, a maximum attenuation of 2.6 nepers in the series arm, and a resistance in said shunt arm.

2. The equalizer arrangement according to claim 1, further comprising means for obtaining a family of curves of given attenuation characteristics, said means including an inductive element in the resonant ciruit, a transformer type connection between said inductive element and the input side of said circuit for changing the reflected impedance of the resonant circuit; a second arm connected across said shunt arm including a resistor, and a coil in series therewith.

3. The equalizer arrangement according to claim 2, further comprising a series connected R—C network connected across the input terminals of said four terminal network, the values of the resistance and capacitance being selected to produce a curve corresponding to the medium curve of the family of curves.

4. The equalizer arrangement according to claim 1 further comprising means for obtaining a family of curves of given attenuation characteristics, said means including variable capacitive and inductive elements in the resonant circuit, and means for varying the resonant frequency of the resonant circuit while maintaining the ratio of $C/L$ constant.

5. The equalizer arrangement according to claim 4 wherein the proportional changes in the capacitive and inductive circuit elements are effected by mechanical linking means between the variable condenser and inductance.

6. The equalizer arrangement according to claim 5 wherein the variable condenser is a rotating condenser mounted on a rotatable shaft and the inductance includes a metal core and a cylindrical coil, said mechanical linking means comprising a disk having a circumferential groove secured to said shaft and wire means having one end fastened in said groove and the other end fastened to said core so that by rotating the disk the condenser is rotated and simultaneously the core is axially displaced with respect to the coil.

7. An adjustable attenuation equalizer for transmission lines, comprising a four terminal network having series and shunt arms, a resonant circuit having a given Q factor and a given maximum attenuation in one of said arms, a family of attenuation curves of said circuit having a slope controlled by varying the resonance frequency of the resonant circuit, said circuit being proportioned in accordance with the relationship $$A_0 = 5.02 - 2.4 f_0 / f_\infty$$

where $A_0$ denoates the given maximum attenuation, $f_0$ denotes the resonance frequency for each curve of the family of curves, and $f_\infty$ denotes the resonance frequency of the network before variation thereof.

8. The equalizer arrangement according to claim 7 wherein said resonant circuit is located in the series arm and comprises a variable resistor in parallel with a variable inductance.

9. The equalizer arrangement according to claim 7 wherein said resonant circuit is located in the shunt arm and comprises a variable resistor in series with a variable condenser.

References Cited in the file of this patent

UNITED STATES PATENTS

| | | |
|---|---|---|
| 1,478,078 | Wente | Dec. 18, 1923 |
| 1,591,073 | Zobel | July 6, 1926 |
| 1,850,146 | Zobel | Mar. 22, 1932 |
| 1,911,253 | Washington | May 30, 1933 |
| 2,096,027 | Bode | Oct. 19, 1937 |
| 2,171,649 | Ewald | Sept. 5, 1939 |
| 2,636,940 | Saraga | Apr. 28, 1953 |